Sept. 18, 1934.　　　　A. SAROSSY　　　　1,974,084
COMBINATION THREAD OR SPIRAL MILLER
Filed Sept. 8, 1932　　　4 Sheets-Sheet 1
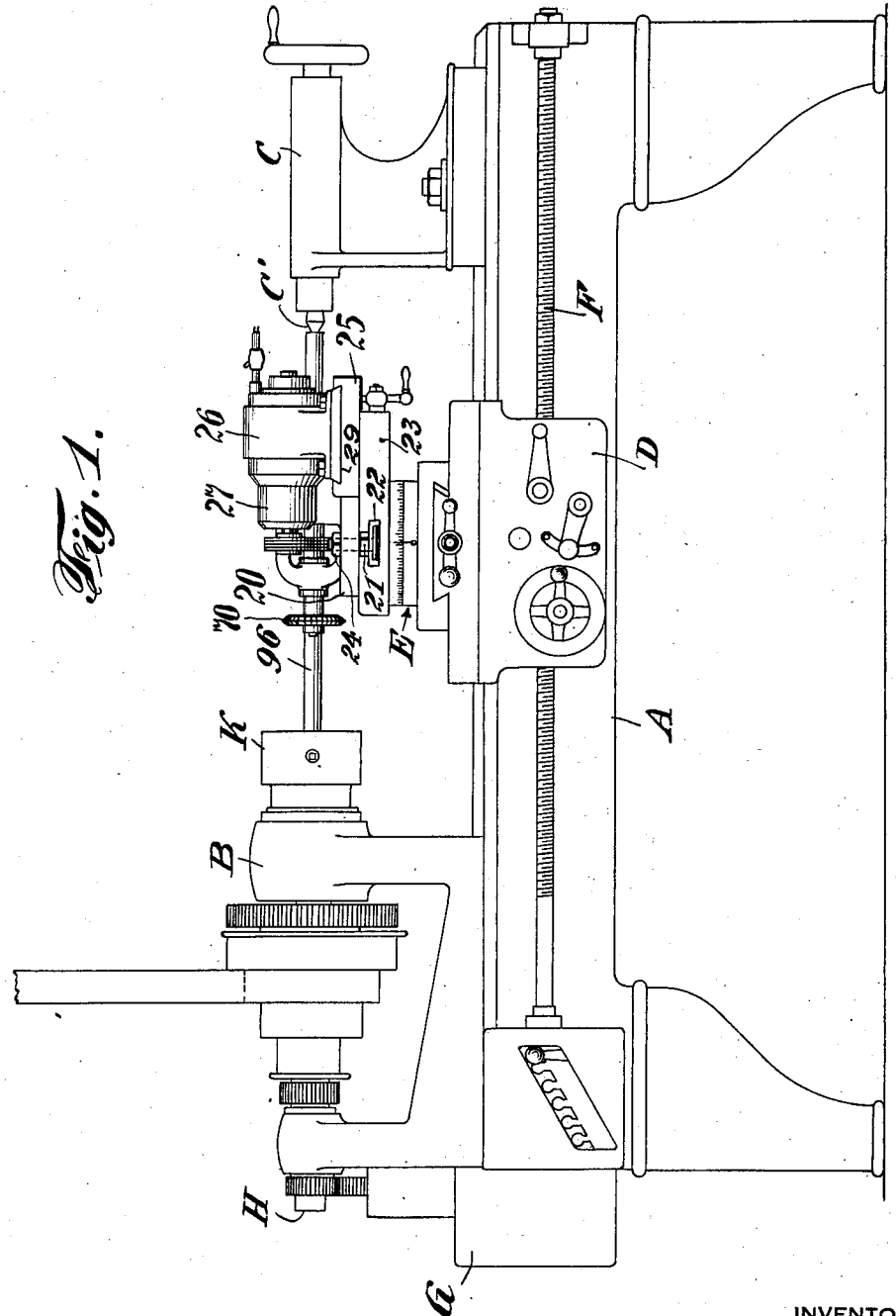
INVENTOR-
Albert Sarossy
BY
his ATTORNEY-

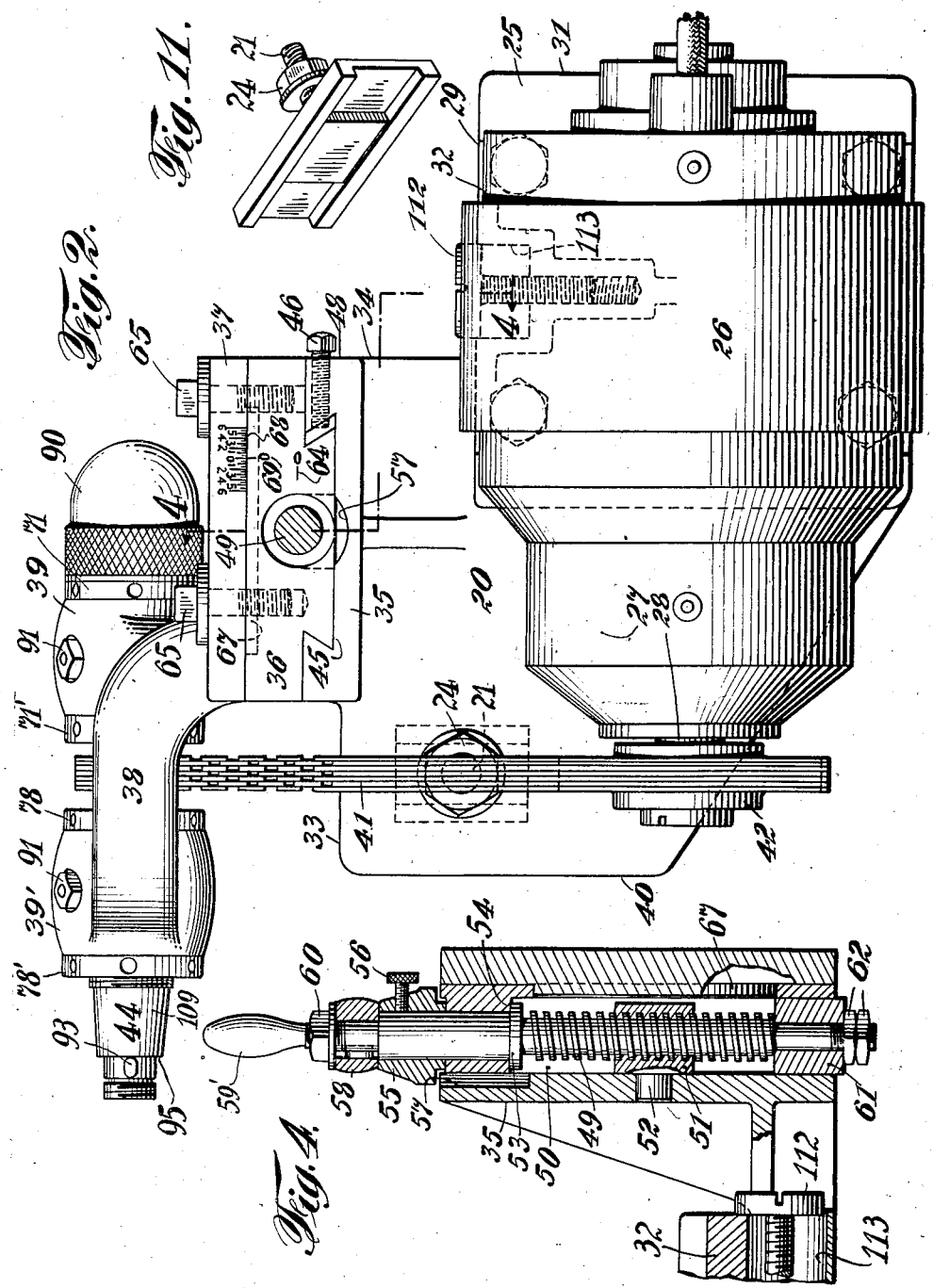

Sept. 18, 1934.  A. SAROSSY  1,974,084
COMBINATION THREAD OR SPIRAL MILLER
Filed Sept. 8, 1932  4 Sheets-Sheet 3
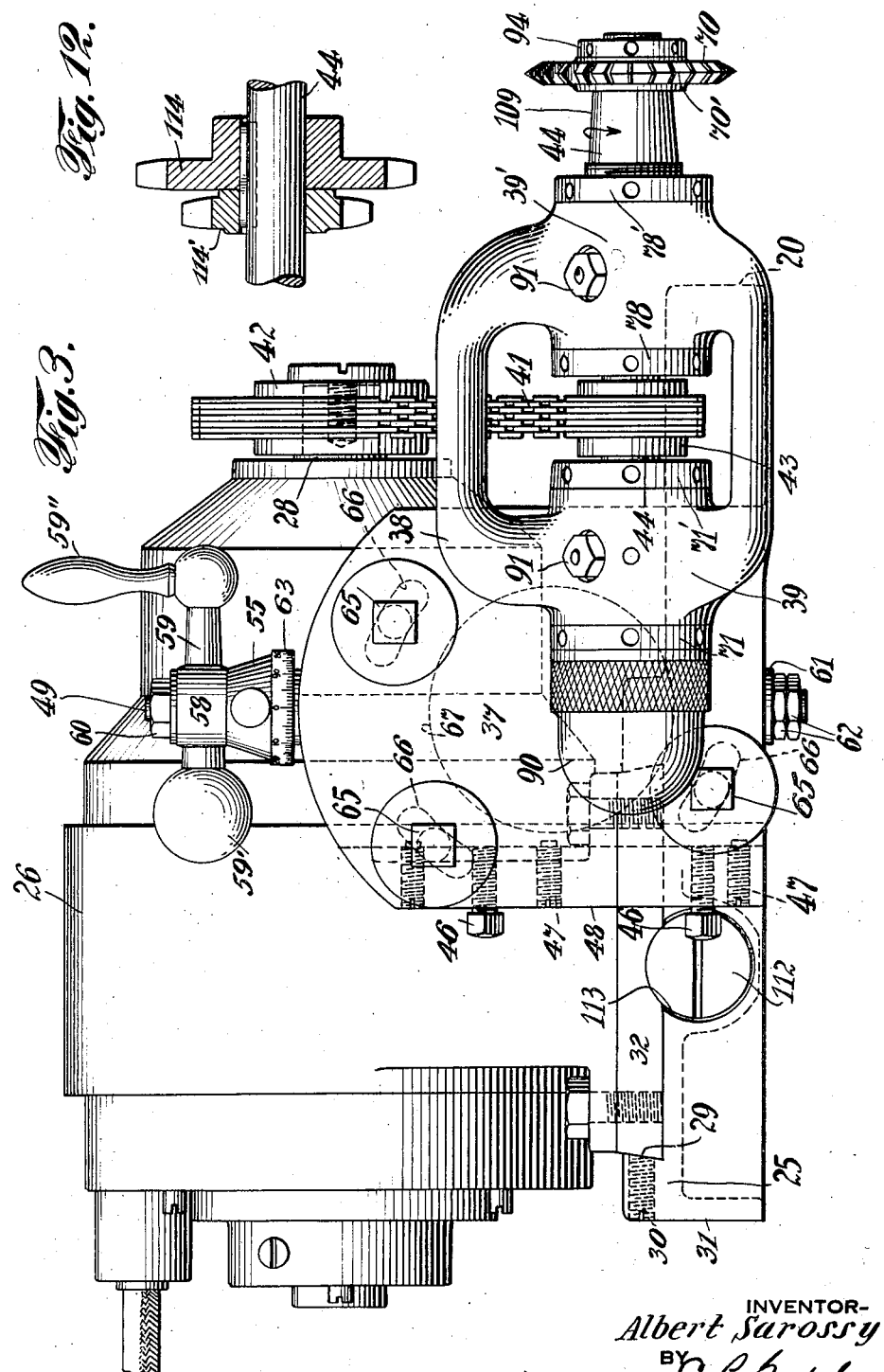
INVENTOR-
Albert Sarossy
BY C. P. Goepel
his ATTORNEY-

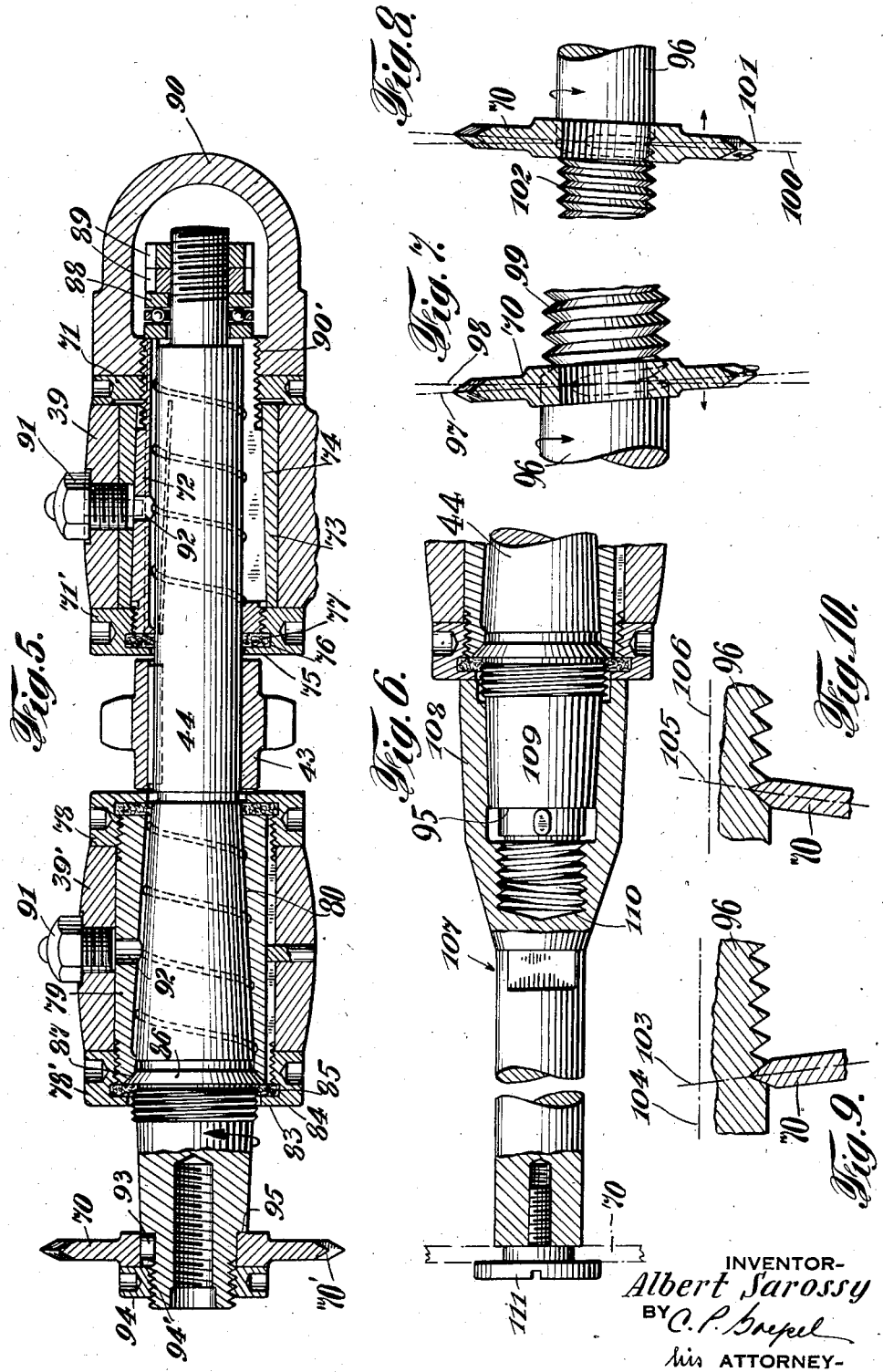

Patented Sept. 18, 1934

1,974,084

UNITED STATES PATENT OFFICE 1,974,084

COMBINATION THREAD OR SPIRAL MILLER

Albert Sarossy, West Orange, N. J., assignor to Layth-Grindar Corporation, Orange, N. J., a corporation of New Jersey Application September 8, 1932, Serial No. 632,124

7 Claims. (Cl. 90—15)

This invention relates to a thread or spiral miller, hereinafter specified as a thread miller, the invention being more particularly related to a new and useful construction of this character for cutting screw or spiral threads on materials such as steel, iron, aluminum, bakelite, hard rubber, and on any alloy or composition on which screw threads can be milled.

In cutting threads, it is customary to grind off the tool bit on a grinding wheel to the desired shape of the thread to be cut. In preparing the usual cutting tool bit, the operator must grind both sides of this tool uniformly to the desired cutting angle, and he must do this accurately while at the same time producing the correct helix angle. This work requires a high degree of skill, is time-consuming and laborious, and it takes a new grinding tool or a different tool bit for every different helix. In operating on the work by a tool bit certain difficulties and disadvantages are invariably present. For example, as the tool bit is held stationary, there is always more or less tearing or ripping of the threads; and if during the threading process the tool bit is removed because of injury, breakage or for regrinding, it cannot be replaced in precisely the same position as previously.

The purpose and object of my invention are to provide an improved thread miller whereby effectually to overcome the foregoing drawbacks and disadvantages, and others which have not been especially mentioned, and further to provide a thread miller which may be produced either as a component feature of an engine lathe or as an attachment for the same, whereby thread milling operations, whether exteriorly or interiorly, may be carried out expeditiously and accurately, even by operators and workmen lacking in the experience and skill necessary to cut accurate threads with the ordinary thread-cutting bit.

An object of my invention is to provide a combination thread or spiral miller in which the shape of the milling cutter is permanent and in which the exact helix angle can be obtained by setting the milling head of the thread miller to any desired angle. The milling cutter itself is of the rotary type provided with circumferential milling teeth and the spindle for this cutter is carried by the milling head for adjustment therewith, so that the exact helix angle can be obtained by adjusting the milling head. As the milling cutter revolves, it always cuts on both sides of the thread, producing even and smooth precision threads. If a milling tooth or two breaks during the progress of the work, it is unnecessary to remove the milling cutter, as there are sufficient remaining teeth to complete the operation.

Another object of the invention is to provide a thread miller of the character described, in which the milling cutter spindle is operated by a flexible chain drive centrally effective between two wide bearings sustaining the milling cutter spindle so as to assure transmission of power to the spindle without vibration, and this transmission chain is mounted for adjustment so as to compensate for the adjustment of the spindle and assure a positive drive without slippage or vibration irrespective of the angle of adjustment of the spindle.

With the foregoing and other objects in view, the invention consists in the construction and relative arrangement of parts so combined as to coact and cooperate with each other in the performance of the functions and the accomplishment of the results herein contemplated, and comprises in its evolvement the simple and practice example illustrated in the accompanying drawings, wherein similar reference characters designate corresponding parts throughout the several views, and in which:—

Figure 1 is a side elevational view of a simple conventional type of engine lathe embodying the thread miller of my invention, this view being taken from the operator's side of the lathe;

Fig. 2 is a top plan view on a larger scale, showing the thread miller detached from the lathe;

Fig. 3 is a side elevational view of the thread miller, showing the same as it appears when looking toward the rear side of the lathe; that is, opposite from the operator;

Fig. 4 represents a vertical sectional view showing the screw and associated parts for elevating and lowering the milling cutter head, this view being taken on the line 4—4 of Fig. 2;

Fig. 5 is a longitudinal sectional view through the bearings for the milling cutter spindle;

Fig. 6 is a longitudinal sectional view, showing the attachment for the milling cutter spindle, for use in internal milling;

Figs. 7 and 8 are fragmentary details, partly in section, showing examples of the inclination of the milling cutter for producing, respectively, right and left-hand threads;

Figs. 9 and 10 are fragmentary sections, more or less diagrammatic in character, illustrating examples of the helix angles for producing, respectively, right and left hand threads;

Fig. 11 is a detail of the lug bolt for securing the base of the milling cutter structure to the lathe compound rest; and Fig. 12 is a fragmentary sectional view, showing change speed gears keyed to the milling cutter spindle.

By referring to the drawings, it will be noted that the invention is disclosed as embodied in a simple conventional type of engine lathe consisting in general of a leg-supported bed A, headstock B, tailstock C having a dead center C', carriage D with a conventional type of compound or tool rest E, feed screw F, differential speed gear box G, and headstock spindle H which carries the chuck K. These mechanisms and parts of this commercial lathe are all known in the art and need not be described. I have omitted from the drawings the details of these well-known mechanisms and parts in order to avoid uselessly obscuring the drawings with a multiplicity of unimportant features, retaining, however, enough to show clearly the application of the invention.

All of the parts of the thread miller structure are arranged in a compact assembly upon a base plate 20 which is mounted upon the compound rest E, and the means for detachably securing the base plate 20 in place upon the compound rest consists of a lug bolt 21 which is engaged in a T-slot 22 provided for the purpose in the top element 23 of the compound rest, the shank of the lug bolt as is usual in a connection of this kind, extending upwardly through a suitable aperture in the base plate 20 and being provided above said plate with a securing nut 24. Said base plate 20, as shown in Fig. 2, is of an irregular elongated form and one side thereof adjacent the operator is formed with a thickened extension 25 for the support of an electric motor 26 with which is combined a gear reduction box 27, these parts being mounted upon the extension so that the driving shaft 28 which protrudes from the forward end of the gear reduction box is in a plane substantially parallel with the longitudinal axis of the lathe bed. The motor is mounted for bodily adjustment in a direction transversely of the width of the lathe bed and the construction of means by which it is so mounted consists in dovetailing the base of the motor at 29 in the extension 25. The motor may be secured in any particular adjusted position by means of a set screw 30 (Fig. 3) which is threaded through the end 31 of the extension so as to engage the dovetailed base 32 of the motor.

The base plate 20 at its remote side 33 and adjacent the end 34 is formed with an integral bracket 35 which extends upwardly in a vertical plane at right angles to the plane of the base plate. This upstanding bracket supports the milling cutter head which, in order to provide for two distinct directions of adjustment, is composed of a vertically adjustable block 36 and a turn block 37, the latter being produced with a laterally offset and forwardly extending integral web 38 with which is integrally formed two bearing heads 39 and 39' in aligned relation but spaced from one another. It will be noted from Figs. 2 and 3, that the base plate is so formed and that the parts carried thereby are so fashioned and arranged that at the end 40 of the base plate which comes adjacent the chuck K (Fig. 1) there will exist a free transversely extending path or space for the operation of a drive, preferably a chain drive 41 for the transmission of power from a driving gear 42 on the protruding end of the driving shaft 28 to a gear 43 located in the space between the bearing heads 39, 39' upon the milling cutter spindle 44 carried thereby (Figs. 2 and 3).

Referring in particular to Fig. 2, it will be seen that the block 36 of the milling cutter head is dovetailed at 45 in the bracket 35 for vertical sliding adjustment therein. Said block 36 may be secured in any vertically adjusted position by means of set screws as 46 and 47 which are threaded through the end 48 of the bracket 35 in a position to be engaged with the dovetailed portion of the block 36 (Figs. 2 and 3).

Manual means are provided whereby to vertically adjust the block 36 very minutely, say, for instance, to a thousandth part of an inch. For this purpose, I provide in the block 36 a vertical adjusting screw 49, having in a vertical chamber or cavity 50 threaded engagement with a sleeve 51 formed with a boss or projection 52 fitted in the bracket 35. At the upper end of the cavity 50, the screw is provided with an annular shoulder 53 engaging below a similar cooperating shoulder 54 of the block 36. Above the block 36, the screw is furnished with a thimble 55 and a set screw 56 threaded laterally into the thimble is provided for securing the thimble in circularly adjusted position rigidly with the screw. Upon the downward sliding movement of the block 36, the thimble is receivable in a suitable recess 57 provided in the bracket 35. Fitted upon the screw in contact with the top of the thimble is a hub 58 of handle 59 provided at one end with a ball 59' and at the opposite end with a vertical crank 59''. A nut 60 is threaded upon the top end of the screw and against the hub 58 for securing the parts in cooperative relation, there being on the reduced lower end of the screw (Fig. 4) a suitable bushing 61 and suitable nuts 62 which are tightened against the bushing. By this arrangement, when the set screws 46 and 47 have been loosened, the screw may be manually actuated for elevating or lowering the block 36. As shown in Fig. 3, the thimble 55 is furnished with a graduated scale 63 in cooperation with an index mark 64 whereby to indicate to the operator the precise degree of the elevating or lowering movement, as the case may be, of the block 36.

Referring to Figs. 2 and 3, it will be seen that the turn block 37 is mounted to the vertically adjustable block 36 by means of lug bolts 65 which extend through arc slots 66, the inner ends of these bolts being screw-threaded in the vertically adjustable block 36. The block 37 is provided with a central circular boss 67 which turnably fits in a corresponding seat in the block 36. Said boss 67 in cooperation with its seat in the block 36 constitutes means whereby properly to guide the turning adjustment of the turn block 37. As shown in Fig. 2, the top edge of the block 37 is provided with a graduated scale 68 in cooperation with an index mark 69 for indicating to the operator the degree of turning adjustment, either to the right or to the left, which right and left adjustments are necessary in order to provide for the milling of right and left hand threads.

70 designates my milling cutter which is formed with circumferential milling teeth 70'. This milling cutter is secured to the outer or free end of the milling cutter spindle 44 which is mounted in the two spaced-apart bearing heads 39 and 39'. Adjoining the opposite ends of the bearing head 39 are annular lock collars 71 and 71' which are internally screw-threaded upon a bearing 72 surrounding the spindle 44, there being in the present exemplification a ring member 73 interposed between the bearing head and bearing 72 and the ring and bushing being cooperatively tapered at 74 in a direction longitudinally of the spindle so as to prevent any mal-adjustment of these parts. The lock collar 71' has formed therein adjacent its flange 75 an annular groove 76 in which suitable packing 77 is installed. The bearing head 39' is similarly provided at its opposite ends with abutting lock collars 78 and 78' which are interiorly threaded upon a bearing 79 surrounding the spindle 44, and it will be noted in this connection that the bearing 79 and spindle 44 are cooperatively tapered at 80 and in such direction that the axial movement of the spindle in the direction of the bearing head 39 is limited. The lock collar 78' has formed therewith a flange 83 so as to provide an annular groove 84 for the installation of packing 85. In this connection it will be noted that the inner wall for the packing groove 84 is composed of an annular rib 86 formed on the spindle and the outer end of the bearing 79, said rib 86 and bushing end being cooperatively tapered at 87. Acting in opposition to the parts forming the respective tapering engagements 80 and 87 is a thrust bearing comprising an anti-friction device 88 and nuts 89 which are threaded upon the spindle and against the anti-friction device so as to maintain the latter against the outer end of the bearing 72. A suitable cap 90 screw-threaded at 90' upon the bearing 72 encloses the thrust bearing. Removable screw plugs 91 provide access to oil openings 92 through which to introduce oil for lubricating the spindle and bearings. The milling cutter spindle 44 is thus mounted for operation in relatively long bearing structures so as to be held against any longitudinal or lateral vibratory displacement upon the application of rotary force thereto through the gear wheel 43 the hub of which is keyed to the spindle between the lock collars 71' and 78. The milling cutter 70 is secured to the nose or free end of the spindle 44 by means of a stout key 93 and a nut 94 is threaded at 94' upon the reduced portion of the spindle so as to bind the milling cutter against a suitable shoulder 95 provided for the purpose on the spindle.

Under the arrangement shown and described, when the block 36 is elevated or lowered, the turn block 37 and hence the spindle 44 and milling cutter 70 are correspondingly adjusted therewith; such vertical adjustment obviously being made so as to position the milling cutter 70 at the elevation where it will best mill the threads on a work-piece 96 gripped at one end in the jaws of the chuck K and supported at the other end in the dead center C' of the tailstock. By loosening the lug bolts 65, the turn block 37 may be adjusted circularly to the position which will give the desired helix angle to the threads, whereupon the lug bolts are tightened. In Fig. 7, I show by way of example, the milling cutter 70 inclined from a perpendicular line 97 to a line 98 so as to provide thereby a helix angle for the production of right-hand threads 99 on a work-piece. In Fig. 8, I show the milling cutter inclined from a vertical line 100 to a line 101 to give a helix angle for the production of left-hand threads 102 on a work-piece. In Fig. 9, I show diagrammatically the inclined line 103 of the milling cutter intersecting the axial center line 104 of the work-piece so as to produce a right-hand thread of a certain helix angle; whereas in Fig. 10 the center line 105 of the milling cutter is represented as intersecting the axis line 106 of the work-piece so as to produce a left-hand thread with a particular helix angle. It will, of course, be understood by those skilled in the art that the number of threads per inch depends as usual on the gear ratio of the lathe. The adjustment of the turn block, as described, changes the pitch or helix angle of the threads.

In Fig. 6, I illustrate an extension 107 designed to be applied to the free or nose end of the milling cutter spindle 44 for use in milling internal threads. The extension 107 has an enlarged hollow end 108 shaped interiorly to fit snugly upon the tapering end 109 of the spindle 44. The portion 108 is provided interiorly with a screw-threaded region 110 for engaging the screw threads at the extreme end of the spindle. For connecting the milling cutter to the outer end of the extension 107, I may provide a headed screw 111 the shank of which is threaded axially into the extension. This extension for use in interior milling may be applied to the spindle 44 without removing the latter from its bearings.

The chain drive between the sprocket gear on driving shaft 28 and the sprocket gear 43 on the miller cutter spindle comprises a flexible or joint chain structure which is adapted to twist laterally to compensate for the angular adjustment of the spindle; and in this connection it will be noted that irrespective of the angular adjustment of the spindle, this flexible chain drive can be readily put into the desired condition of tautness by adjusting the position of the electric motor upon the base plate. As a means for readily adjusting the position of the electric motor when the set screws 30 have been loosened, I provide a screw 112 the shank of which is threaded into the base plate and the head of which is adapted to engage over the base portion 32 of the motor. Within the base plate there is provided for a distance an open cavity 113 the diameter of which is larger than the head of the screw 112, so that through the turning of this screw the base portion of the motor may be moved in the dovetailed groove just far enough to give the flexible drive the desired degree of tautness.

In place of the sprocket gear 43, I may provide two change speed sprocket gears 114 and 114' which are keyed to the milling cutter shaft with one hub fixed to the other as shown in Fig. 12. Where two change speed gears are used upon the milling cutter shaft two change speed gears (not shown) may also be used upon the driving shaft 28.

It will be recognized that the construction of my thread miller evidences in its simplest form a milling cutter head composed of parts providing for vertical adjustment and angular adjustment, the first-named adjustment making provision for raising and lowering the milling cutter to any desired elevated position relatively to the work-piece to be operated upon, while the second-named adjustment makes provision for cutting the thread at the precise helix angle desired, irrespective of whether the thread is of the right-hand kind or of the left-hand kind. It will further be recognized that when the milling cutter is supported on the spindle extension, internal threads, whether of the right- or left-hand types, can be produced with exact precision and facility.

Irrespective of the angular adjustment of the milling cutter spindle, the flexible chain can twist laterally upon itself to compensate for such adjustment, and inasmuch as the motor is bodily adjustable upon the base plate, the said chain drive can readily be given the degree of tautness necessary to assure a positive drive without slippage. As the driving power of the chain is exerted on the milling cutter spindle between the two wide bearings which are one piece with the turn block, vibration is reduced to a minimum so that even, smooth threads can be produced on steel, iron and other hard materials. It will also be recognized that the threads can be cut quickly as well as accurately, since the milling cutter with its circumferential teeth revolves rapidly while milling the revolving workpiece.

While the invention has been illustrated and described with some degree of particularity, it is realized that in practice various changes and alterations may be made therein, and further that the invention is capable of embodiment in many different lathe constructions. It has been sought herein to illustrate only such an embodiment as will suffice to exhibit the character of the invention. Reservation is, therefore, made to the right and privilege of changing the form of the details of construction or otherwise altering the arrangement of parts without departing from the spirit or scope of the invention or the scope of the appended claims.

I claim:—

1. In improved thread milling mechanism, the combination of a spindle, a milling cutter fixed thereto, spaced integrally connected bearings supporting the spindle for rotation, a head member supporting said bearings, a block upon which said head member is supported for limited rotary adjustment, a bracket upon which said block is mounted for limited vertical adjustment, a power transmission connected with the spindle between said spaced bearings, said transmission comprising an electric motor bodily mounted for adjustment toward and away from the spindle and a flexible chain therewith adjustable, the runs of said chain extending between the spindle and motor and adapted to twist and cross with respect to one another to provide for the operation of the spindle in any adjusted position permitted by the limited adjustments of said block and head member.

2. Lathe milling mechanism, comprising a horizontal base adapted to be secured to the operating compound rest of the lathe, a bracket upstanding from the base, an electric motor mounted on the base for bodily adjustment thereon in a direction toward and away from the bracket and having a projecting driving shaft, a head attached to the bracket and carrying a milling spindle normally substantially parallel with the driving shaft, said head including parts relatively adjustable to cause said spindle to assume different angular positions with respect to the driving shaft, a flexible chain drive connected between the driving shaft and spindle and adapted to twist upon itself and to have driving function irrespective of the angular adjustment of the spindle and to be conditioned as to tautness by the bodily adjustment of the motor with respect to the bracket.

3. Improved thread milling mechanism, comprising a horizontal base adapted to be attached to the traveling compound rest of the lathe and having an integral upstanding wall at one side, a milling head adjustably attached to the outer face of the wall, carrying a milling spindle parallel therewith and extending into a plane outside the boundary outline thereof, an electric motor located upon the base and having a driving shaft in opposing relation to the milling spindle, said motor being connected with the base for bodily adjustment in a direction thereon to facilitate bringing its driving shaft toward and away from the spindle, a milling cutter detachably mounted on the spindle, and a flexible chain outside the boundary outline of the wall connecting sprocket gears on the motor driving shaft and spindle, at least one of said gears being a change speed gear to effect change in speed to accord with the dimension of milling cutter employed.

4. As a new article of manufacture, an improved thread milling attachment consisting of a one-piece integral base including a vertical wall at one side of the base, a block engaged with the outer face of the wall for vertical adjustment, a second block engaged with the outer face of the first block for turning adjustment parallel therewith and carrying a milling spindle parallel therewith, which spindle extends into a plane outside the boundary outlines of the wall and the two blocks, an electric motor with a driving spindle mounted upon the base for bodily adjustment thereon so as to bring its driving shaft toward and away from the spindle in opposing relation thereto, and a flexible chain drive outside the boundary outlines of the wall and two blocks connecting the driving shaft and spindle.

5. In improved thread milling mechanism, a horizontal base with a wall at one side, which base is adapted to be attached to the feed carriage of a lathe, means for mounting a milling spindle to the wall to adjust the spindle parallel with the same and so that the spindle always projects outside the boundary outline of the wall, an electric motor mounted upon the base for bodily adjustment thereon to bring its driving shaft toward and away from the spindle and in a position in which it projects outside the boundary outline of the wall opposite the projecting spindle, and a flexible chain outside the boundary outline of the wall connecting the projecting portions of the spindle and motor driving shaft.

6. In an improved thread milling attachment, the combination of a base plate, a wall associated therewith, extending upwardly from one edge thereof, an electric motor the base of which is slidably engaged in said plate for moving the motor toward and away from said wall, said motor having a driving shaft substantially parallel with the wall and protruding into a plane outside the boundary outline thereof, a milling head adjustably associated with said wall, a bearing carrying a milling shaft in opposed relation to the motor shaft, said bearing being rigidly connected with said head for adjustment therewith and said shaft protruding into a plane outside the boundary outline of said wall opposite the motor shaft, means for securing the motor in adjusted position on the base, means for securing the milling head in adjusted position on the wall, and means connecting the milling spindle and the motor shaft for operating the former irrespective of the adjusted position of the milling head with respect to the adjusted position of the motor, comprising a flexible chain drive the runs of which are adapted to twist and cross with respect to one another outside the boundary outline of said wall.

7. In an improved thread milling mechanism which includes a horizontal base having a fixed upstanding wall at one side and means supporting a plate body adjacent the outer face of the wall for limited movement in a plane parallel with the plane of the wall, power-operated driving mechanism mounted upon said base at the opposite side of the wall for bodily adjustment toward and away from said wall in parallel relation thereto and carrying a driving member outside the projection of the transverse outline of the wall and body, two bearings and their integral connection formed as an integral part of said body, said bearings being axially aligned but spaced apart to provide a gap between them, a milling spindle rotatable in the bearings and extending across said gap and carrying a gear therein, a flexible chain drive connecting said driving member with said gear and adapted to be conditioned as to tautness by the bodily adjustment of said power-operated driving mechanism, said integral connection being formed to span the chain at a spaced distance and extending in its longitudinal direction parallel with the wall and body and to an extent sufficient to position said gear and therewith connecting chain outside the projection of the transverse outline of the wall and body and opposite said driving member, all within the range of the movement permitted to the body.

ALBERT SAROSSY.